United States Patent [19]

Pechanek et al.

[11] Patent Number: 6,101,592
[45] Date of Patent: Aug. 8, 2000

[54] METHODS AND APPARATUS FOR SCALABLE INSTRUCTION SET ARCHITECTURE WITH DYNAMIC COMPACT INSTRUCTIONS

[75] Inventors: Gerald G. Pechanek; Edwin F. Barry; Juan Guillermo Revilla, all of Cary; Larry D. Larsen, Raleigh, all of N.C.

[73] Assignee: Billions of Operations Per Second, Inc., Chapel Hill, N.C.

[21] Appl. No.: 09/215,081

[22] Filed: Dec. 18, 1998

Related U.S. Application Data

[60] Provisional application No. 60/068,021, Dec. 18, 1997.

[51] Int. Cl.$^7$ .................................................... G06F 15/80
[52] U.S. Cl. ................................. 712/20; 712/22; 712/24; 712/209; 712/212
[58] Field of Search ................................. 712/20, 21, 22, 712/24, 209, 212

[56] References Cited

U.S. PATENT DOCUMENTS

| | | | |
|---|---|---|---|
| 5,057,837 | 10/1991 | Colwell et al. | 341/55 |
| 5,555,428 | 9/1996 | Radigan et al. | 712/24 |
| 5,649,135 | 7/1997 | Pechanek et al. . | |
| 5,761,470 | 6/1998 | Yoshida | 712/210 |
| 5,787,302 | 7/1998 | Hampapuram et al. | 712/24 |
| 5,819,058 | 10/1998 | Miller et al. | 712/210 |
| 5,822,606 | 10/1998 | Morton | 712/24 |
| 5,870,576 | 2/1999 | Faraboschi et al. | 712/24 |
| 5,901,301 | 5/1999 | Matsuo et al. | 712/212 |
| 5,926,644 | 7/1999 | Hays | 712/24 |
| 5,930,508 | 7/1999 | Faraboschi et al. | 712/24 |
| 5,983,336 | 11/1999 | Sakhin et al. | 712/24 |

OTHER PUBLICATIONS

Andrew Tanenbaum, *Structured Computer Organization*, Prentice Hall, pp. 156–158, 204, and 206–207, 1984.

DeGloria et al., "A Programmable Instruction Format Extension to VLIW Architectures", Proceedings of CompEuro '92: Computer Systems and Software Engineering, pp. 35–40, May 4–8, 1992.

G.D. Jones and L.D. Larsen, "Selecting Predecoded Instructions with a Surrogate", IBM Technical Disclosure Bulletin, vol. 36, No. 06A, Jun. 1993, pp. 35–37.

G.D. Jones and L.D. Larsen, "Pre–Composed Superscalar Architecture", IBM Technical Bulletin, vol. 37, No. 09, Sep. 1994, pp. 447–451.

*Primary Examiner*—William M. Treat
*Attorney, Agent, or Firm*—Law Offices of Peter H. Priest

[57] ABSTRACT

A hierarchical instruction set architecture (ISA) provides pluggable instruction set capability and support of array processors. The term pluggable is from the programmer's viewpoint and relates to groups of instructions that can easily be added to a processor architecture for code density and performance enhancements. One specific aspect addressed herein is the unique compacted instruction set which allows the programmer the ability to dynamically create a set of compacted instructions on a task by task basis for the primary purpose of improving control and parallel code density. These compacted instructions are parallelizable in that they are not specifically restricted to control code application but can be executed in the processing elements (PEs) in an array processor. The ManArray family of processors is designed for this dynamic compacted instruction set capability and also supports a scalable array of from one to N PEs. In addition, the ManArray ISA is defined as a hierarchy of ISAs which allows for future growth in instruction capability and supports the packing of multiple instructions within a hierarchy of instructions.

12 Claims, 18 Drawing Sheets

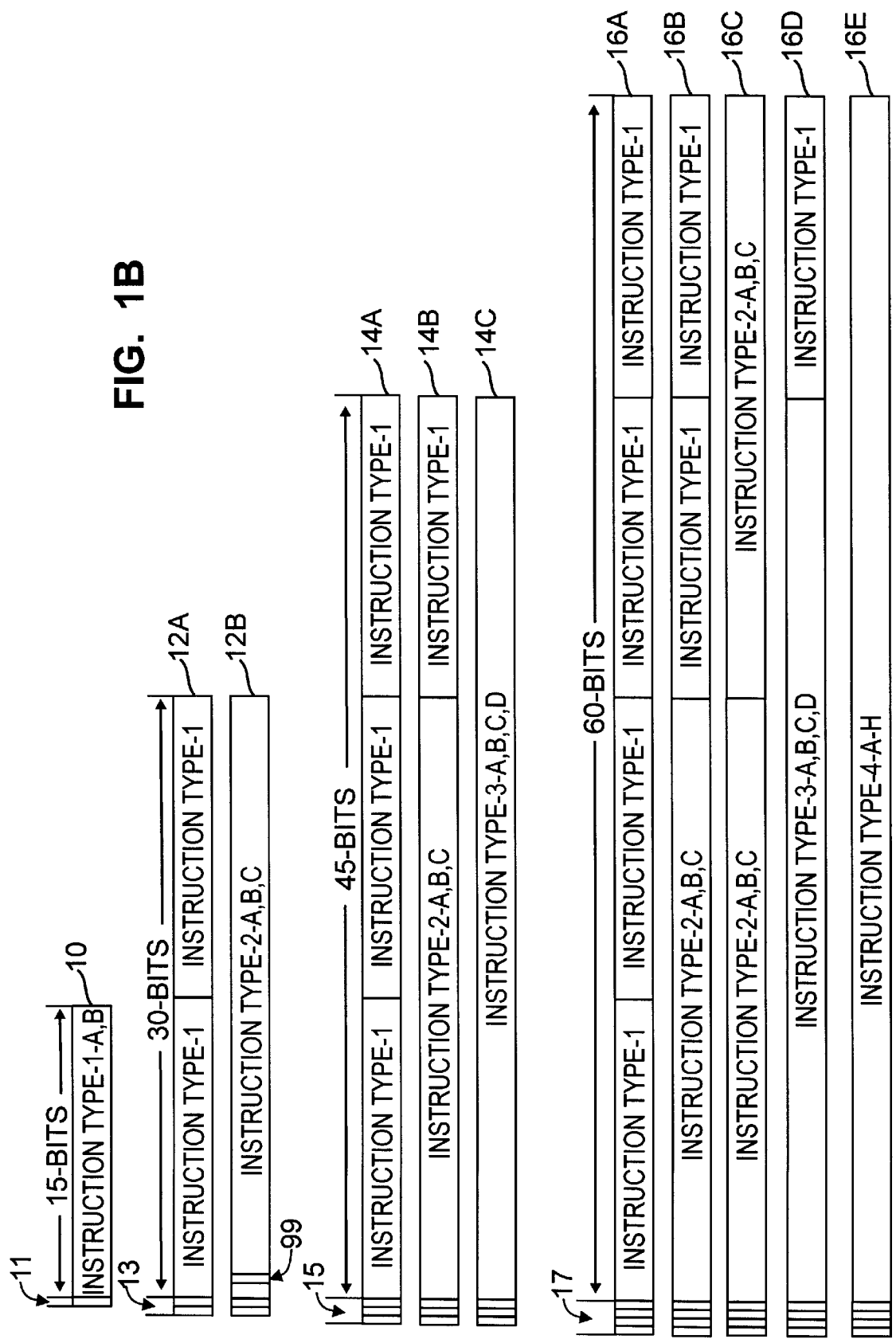

| 31 | 29 | 15 14 | 0 |
|---|---|---|---|
| 00 | | Compact Instruction Execute 2nd position | Compact Instruction Execute 1st position |

| 31 | 22 | 15 | 11 | | 0 |
|---|---|---|---|---|---|
| 00 | 00 | Mpy, Div, BitOps, Extract, & Permute | 00 | Mpy, Div, BitOps, Extract, & Permute |
| | 01 | Control & iVLIW | 01 | Control & iVLIW |
| | 10 | Load & Store | 10 | Load & Store |
| | 11 | ALU & DSU | 11 | ALU & DSU |

| 29 28 27 26 25 24 | 23 | 22 21 20 19 18 17 | 16 15 |
|---|---|---|---|
| 14 13 12 11 10 9 | 8 | 7 6 5 4 3 2 | 1 0 |
| 0000 MPYL | | Rt | Rx | Ry |
| 0001 DIV | | Rt | Rx | Ry |
| 0010 BLI (F0)<br>0011 BANDI (F0)<br>0100 BORI (F0)<br>0101 BXOR (F0) | N | Bit Select | Rs |
| 0000 Bswapi (F0) | 0 | Bit Select | Rs |
| 0111 BSI (F0)<br>1000 BNOTI<br>1001 BCLRI<br>1010 BSETI | 0 | Bit Select | Rt |
| 1011 Reserved | | | |
| 1100 EXT<br>1101 PERM | | Rt | Rx | Ry |
| 1110 EXTIL | Rt | Immed. 5-bit Field Length<br>Ry=R7, Rt=R4/R5 | Rx |
| 1111 EXTIS | Rt | Immed. 5-bit Field Length<br>Ry=R7, Rt=R4/R5 | Rx |

MPY, DIV, BitOps, Extract, & Permute 00

FIG. 3B

| 29 | 28 | 27 | 26 | 25 | 24 | 23 | 22 | 21 | 20 | 19 | 18 | 17 | 16 | 15 | |
|---|---|---|---|---|---|---|---|---|---|---|---|---|---|---|---|
| 14 | 13 | 12 | 11 | 10 | 9 | 8 | 7 | 6 | 5 | 4 | 3 | 2 | 1 | 0 | |
| Control & iVLIW 01 | | 000 LOOP | | | LCR | 9-bit displacement value | | | | | | | | | 320 |
| | | 001 RETI | | | | | | | | | | | | | 321 |
| | | 010 UcJMP | | | | Range +511/-512 from PC SDISP10 | | | | | | | | | 322 |
| | | 011 JMPcc | | | Z, GT T.op,F.op | Range +128/-128 from PC SDISP8 | | | | | | | | | 323 |
| | | 100 SPXV | | | S | L | A | M | D | 5-bit VimOffs Vb=V0 | | | | | 324 |
| | | 101 PEXV | | | | | | | | | | | | | 325 |
| | | 110 Reserved | | | | Reserved | | | | | | | | | 327 |
| | | 111 Special | | | 00,01,10 | Reserved | | | | | | | | | 326 |
| | | | | | 11 NOP | | | | | | | | P | 0 | |

P=0 EXECUTE TWO 15-BIT INSTRUCTIONS IN PARALLEL
P=1 EXECUTE TWO 15-BIT INSTRUCTIONS SEQUENTIALLY

FIG. 3C

| 29 28 27 26 25 24 23 22 21 20 19 18 17 16 15 | | | | | | | | | |
|---|---|---|---|---|---|---|---|---|---|
| 14 13 12 11 10 9 8 7 6 5 4 3 2 1 0 | | | | | | | | | |
| Load & Store 10 | 00 Load | 0 ind | W H0 | 0 index | psi prd | update | Ae reg pair | Rt | Base+ Index |
| | | 0 ind | W H0 | 1 indrct | psi prd | update | A0-A3 | Rt | Indirect |
| | | 1 disp | W H0 | A0/A1 | 5-bit Displacement | | | Rt | Base (A0/ A1) + Disp |
| | 01 Store | 0 ind | W H0 | 0 index | psi prd | update | Ae reg pair | Rs | Base+ Index |
| | | 0 ind | W H0 | 1 indrct | psi prd | update | A0-A3 | Rs | Indirect |
| | | 1 disp | W H0 | A0/A1 | 5-bit Displacement | | | Rs | Base (A0/ A1) + Disp |
| | 10 LIM to b0 | | | | 8-bit Immediate | | | | |
| | 11 LTBL to H0 & Resrvd | 00=Rt/Az | | | | Rt | An | Az | |
| | | 01=Rt/Rz | | | | Rt | An | Az | |
| | | 10=Resrvd | | | | | | | |
| | | 11=Resrvd | | | | | | | |

*psi = post increment   *prd = predecrement   *disp = base + displacement

FIG. 3D

| 29 28 27 26 25 24 23 22 21 20 19 18 17 16 15 | | | | |
|---|---|---|---|---|
| 14 13 12 11 10 9 8 7 6 5 4 3 2 1 0 | | | | |
| 340 | 000 Add | W HO | | Rx | Ry |
| 341 / 343 | 001 Addi/Subi | W HO | A/S | UIMM5 | Ry |
| 342 | 010 Sub | W HO | Rt | Rx | Ry |
| 344 | 011 Logic | | 00=AND,01=OR, 10=NOT,11=XOR | Rt=0-3 | Rx | Ry |
| 345 | 100 WordComp | | CC Type | Rx | Ry |
| 346 | 101 WordComp Immediate | | 00=AND,01=OR, 10=NOT,11=XOR | UIMM5 | Ry |
| 347 | 110 Shift/Rotate | | S/R Type | S/R Amount | Rt/Ry |
| 348 | 111 Copy Word | T=0 S=1 | CRF/ARF/MRF  T=R0-63←R0-7, S=R0-7→R0-63 | | Rt/Rs |

ALU & DSU 11

Condition codes (CC Type):
Z, NZ, HI, HS, LO, LS, VS, VC, POS, NEG, GE, GT, LE, LT 000=WORD SHIFT ARITH RIGHT, 001=WORD SHIFT LOGICAL RIGHT, 010=WORD SHIFT ARITH LEFT, 011=WORD SHIFT LOGICAL LEFT, 100=WORD ROTATE RIGHT, 101=WORD ROTATE RIGHT THRU CARRY, 110=WORD ROTATE LEFT, 111=WORD ROTATE LEFT THRU CARRY

FIG. 6

| 31 | 30 29 | 15 14 | 0 |
|---|---|---|---|
| 00 | Compacted Instruction Execute 2nd position | Compacted Instruction Execute 1st position | |

| 31 | 30 29 | 15 14 | 0 |
|---|---|---|---|
| 00 | 222 / 987 | 1 111 / 5 432 | |

| 222/987 | | 1111/5432 | |
|---|---|---|---|
| 000 | Store | 000 | Store |
| 001 | Load | 001 | Load |
| 010 | ALU | 010 | ALU |
| 011 | MAU | 011 | MAU |
| 100 | DSU-1 Div/Ext & BitOps | 100 | DSU-1 Div/Ext & BitOps |
| 101 | DSU-2 Shift/Rot & ExtiI/Extis | 101 | DSU-2 Shift/Rot & ExtiI/Extis |
| 110 | Control-1 | 110 | Control-1 |
| 111 | Control-2 | 111 | Control-2 |

| 29 28 27 26 25 24 | 23 22 21 20 19 18 17 16 15 | | | |
|---|---|---|---|---|
| 14 13 12 11 10 9 | 8 7 6 5 4 3 2 1 0 | | | |
| 611 — 000=Store, | Store VimOffs, Vb=V0 | Rs MapsOut bits 16, 17, 18 | An/e MO bits 12,13 | Update/Disp MapsOut bits 0-3 |
| 612 — 001=Load, | Load VimOffs, Vb=V0 | Rt MapsOut bits 16, 17, 18 | An/e MO bits 12,13 | Update/Disp MapsOut bits 0-3 |
| 613 — 010=ALU, | ALU VimOffs, Vb=V0 | CC/Rt MapsOut bits 16, 17, 18 | Rx MapsOut bits 6, 7, 8 | Rx MapsOut bits 11, 12, 13 |
| 614 — 011=MAU, | MAU VimOffs, Vb=V0 | Rt MapsOut bits 16, 17, 18 | Rx MapsOut bits 6, 7, 8 | Rx MapsOut bits 11, 12, 13 |
| 615 — 100=DSU-1, Type0 Div/Ext Type1 BitOps | DSU VimOffs, Vb=V0 | Rx MapsOut bits 11, 12, 13 | Type 0 / Type 1 | Rt/y MapsOut Bits 16, 17 / Rx MapsOut bits 11, 12, 13 |
| 616 — 101=DSU-2, Type 0 Shift/Rot Type 1 Extil/tis | DSU VimOffs, Vb=V0 | Rt/s MapsOut bits 16, 17, 18 / Rt/y MapsOut bits 16, 17, 18 | Type 0 / Type 1 | Nbits MapsOut bits 6, 7, 8, 9, 10 / Starbit FieldIen MapsOut bits 1, 2, 3, 4, 5 |
| 617 — 110=Control-1, 618 — 111=Control-2. | Instruction Specific Assignments | | | |

| 29 28 27 | 26 25 24 23 | 22 21 20 19 18 17 16 15 |
|---|---|---|
| 14 13 12 | 11 10 9 8 | 7 6 5 4 3 2 1 0 |
| Control-1 110 | 00 LOOP | LCR, 9-bit displacement value |
| | 01 RETI | |
| | 10 UcJMP | Range +511/-512 from PC SDISP10 |
| | 11 JMPcc | Z, GT T.op, F.op, Range +128/-128 from PC SDISP8 |
| Control-2 111 | 00 SPXV | S, L, A, M, D |
| | 01 PEXV | 5-bit VimOffs Vb=V0 |
| | 10 Reserved | Reserved |
| | 11 NOP+ | 00,01,10 Reserved |
| | | 11 NOP — P 0 — 0 |

P=0 EXECUTE TWO 15-BIT INSTRUCTIONS IN PARALLEL
P=1 EXECUTE TWO 15-BIT INSTRUCTIONS SEQUENTIALLY

LV2-LOAD/MODIFY VLIW - 2 —755

ENCODING

750

| 31 30 29 28 | 27 26 25 24 23 22 | 21 | 20 | 19 18 17 16 | 15 14 13 12 | 11 | 10 | 9 | 8 | 7 | 6 5 4 3 2 1 0 |
|---|---|---|---|---|---|---|---|---|---|---|---|
| GROUP S/P | CtrlOp | 0 | LI d | InstrCnt | UnitVIM | 0 | 0 | 0 | 0 | 0 | Vb 0 | VIMOFFS |

SYNTAX/OPERATION

| INSTRUCTIONS | OPERANDS | OPERATION |
|---|---|---|
| LV2.[SP] | LI, u=UnitVIM, V[01], VIMOFFS, InstrCnt, d | if (LI = 0) Load disable bit only<br>disable bit @(V[01]+VIMOFFS)[UnitVIM]← d<br><br>if (LI = 1) Load Instructions<br>disable bit @(V[01]+VIMOFFS)[UnitVIM]← d<br><br>Load next InstrCnt instructions into<br>(V[01]+VIMOFFS)[UnitVIM]←1st Instruction following LV2<br>(V[01]+VIMOFFS+1)[UnitVIM]←2nd Instruction following LV2<br>:<br>(V[01]+VIMOFFS+InstrCnt)[UnitVIM]← (InstrCnt)$^{th}$ Instruction following LV2<br><br>InstrCnt is a binary coded number, 0 thru F, that represents from 1 to 16 instructions that can be loaded into up to 16 consecutive UnitVIM |

METHODS AND APPARATUS FOR SCALABLE INSTRUCTION SET ARCHITECTURE WITH DYNAMIC COMPACT INSTRUCTIONS

CROSS-REFERENCE TO RELATED APPLICATION

The present application claims the benefit of U.S. Provisional Application Serial No. 60/068,021 entitled "Methods and Apparatus for Scalable Instruction Set Architecture" and filed Dec. 18, 1997.

FIELD OF THE INVENTION

The present invention relates generally to improvements in array and indirect Very Long Instruction Word (iVLIW) processing, and more particularly to a scalable instruction set architecture which is hierarchically defined.

BACKGROUND OF THE INVENTION

The Instruction Set Architecture (ISA) of a processor defines its operational characteristics. Given the development investment in tools and application code for the processor, the ISA typically represents a fixed quantity with minimal room for growth. It is possible to develop supersets of an instruction set architecture, but even this is many times difficult given that the overall fixed core ISA is usually defined without scalability, i.e., planned growth, in mind. In addition, it is a difficult problem to develop a single ISA for a family of array processors in order to amortize development expenses across a family of products, encompassing a range of 16-bit, 32-bit, and larger instruction set formats. Thus, it has been recognized that it will be highly advantageous to have a hierarchical instruction set as discussed further below.

SUMMARY OF THE INVENTION

A manifold array (ManArray) architecture in accordance with the present invention solves the problem of instruction set scalability by defining a hierarchical instruction set which includes pluggable instruction set capability and support for array processors. The hierarchical instruction set allows application specific processors to be developed which contain new instructions that provide optimized capabilities for specific applications. These capabilities can result in higher performance, improved code density, and new functionality, such as support for low power features. The term pluggable is from the programmer's viewpoint and relates to groups of instructions that can easily be added to a processor architecture for code density and performance enhancements.

One specific aspect addressed by this invention is a unique compacted instruction set which allows the programmer the ability to dynamically create a set of compacted instructions on a task by task basis for the primary purpose of improving control and parallel code density. These compacted instructions are parallelizable in that they are not specifically restricted to control code application but can be executed in the processing elements (PEs) in an array processor. The ManArray family of processors is designed for this dynamic compacted instruction set capability and also supports a scalable array of from one to N PEs. In addition, the Moray ISA is defined as a hierarchy of ISAs which allows for future growth in instruction capability and supports the packing of multiple instructions within a hierarchy of instructions. Advantageous characteristics of the ManArray ISA are:

Hierarchical ISA for future growth

Support for uniprocessors

Support for single PE designs as well as MxN array processors

Dynamic application specific pluggable instructions

Improved code density

Designed for standard bus and memory sizes, in multiples of 16-bits:

16-bit ISA 32-bit ISA 48-bit ISA 64-bit ISA and so on.

These and other advantages of the present invention will be apparent from the drawings and the Detailed Description which follows.

BRIEF DESCRIPTION OF THE DRAWINGS

FIG. 1B illustrates ManArray Scalable Instruction Set formats in accordance with the present invention;

FIG. 2A illustrates a presently preferred 32-bit compacted type-1 instruction format containing two 15-bit compacted instructions in accordance with the present invention;

FIG. 2B illustrates an exemplary grouping of compacted type-1 instructions;

FIG. 3A illustrates details for Multiply (Mpy), Divide (Div), bit-operation, extract, and permute instructions for a type-1 compact instruction set;

FIG. 3B illustrates flow-control-A instruction details;

FIG. 3C illustrates load and store instruction details;

FIG. 3D illustrates arithmetic logic unit (ALU) and data select unit (DSU) instruction details;

FIG. 6 illustrates a preferred second form of the compacted instructions (compacted form-2) termed the iVLIW Memory (VIM) translation compacted instruction set format;

FIG. 6A illustrates an exemplary grouping of compacted form-2 instructions;

FIG. 6B illustrates details of an exemplary form of the VIM translation compacted instruction set;

FIG. 6C illustrates flow control-B instructions;

FIG. 7B illustrates the Load/Modify VLIW-2 (LV2) instruction format and syntax/operation definition.

DEATILED DESCRIPTION

The present invention is preferably used in conjunction with the ManArray architecture various aspects of which are described in greater detail in U.S. patent application Ser. No. 08/885,310 filed Jun. 30, 1997, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, and U.S. patent application Ser. No. 09/205,558 filed Dec. 4, 1998 and entitled "Methods and Apparatus for Dynamic Very Long Instruction Word Sub-Instruction Selection for Execution Time Parallelism in an Indirect Very Long Instruction Word Processor", Provisional Application Serial No. 60/068,021 entitled "Methods and Apparatus for Scalable Instruction Set Architecture" filed Dec. 18, 1997, Provisional Application Serial No. 60/071,248 entitled "Methods and Apparatus to Dynamically Expand the Instruction Pipeline of a Very Long Instruction Word Processor" filed Jan. 12, 1998, Provisional Application Serial No. 60/072, 915 entitled "Methods and Apparatus to Support Conditional Execution in a VLIW-Based Array Processor with Subword Execution" filed Jan. 28, 1988, Provisional Application Ser. No. 60/077,766 entitled "Register File Indexing Methods and Apparatus for Providing Indirect Control of Register in a VLIW Processor" filed Mar. 12, 1998, Provisional Application Ser. No. 60/092,130 entitled "Methods and Apparatus for Instruction Addressing in Indirect VLIW Processors" filed Jul. 9, 1998, Provisional Application Serial No. 60/103,712 entitled "Efficient Complex Multiplication and Fast Fourier Transform (FFT) Implementation on the ManArray" filed Oct. 9, 1998, and Provisional Application Serial No. 60/106,867 entitled "Methods and Apparatus for Improved Motion Estimation for Video Encoding" filed Nov. 3, 1998, respectively, and incorporated herein in their entirety.

Figure 1A:
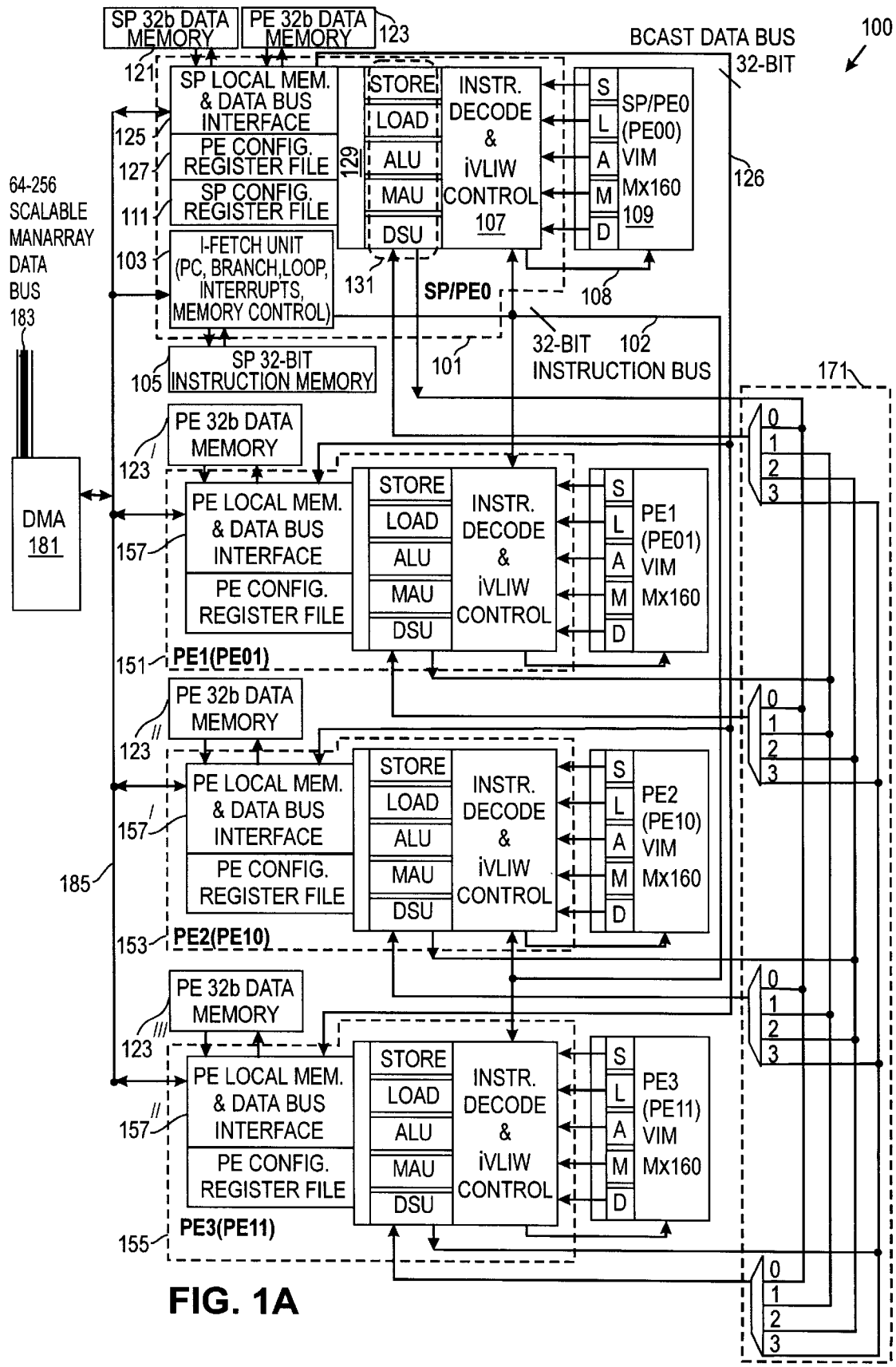
FIG. 1A illustrates a ManArray 2×2 iVLIW processor which can suitably be employed with this invention.

In a presently preferred embodiment of the present invention shown in FIG. 1A, a ManArray 2×2 iVLIW Single Instruction Multiple Data stream (SIMD) processor 100 includes a controller Sequence Processor (SP) combined with Processing Element-0 (PE0) SP/PE0 101, as covered in further detail in U.S. application Ser. No. 09/169,072 entitled "Methods and Apparatus for Dynamic Merging an Array Controller with an Array Processing Element", and filed Oct. 9, 1998. Three additional PEs 151, 153, and 155 are employed as part of the processor 100 and are representative of PEs that can implement the scalable instruction set architecture with dynamic compact instructions. It is noted that the PEs can also be labeled with their matrix positions as shown in parentheses for PE0 (PE00) 101, PEI (PE01) 151, PE2 (PE10) 153, and PE3 (PE11) 155. The SP/PE0 contains a fetch controller 103 to allow the fetching of 32-bit simplex instruction words (SIWs) from a 32-bit instruction memory 105. The fetch controller 103 provides the typical functions needed in a programmable processor such as a program counter (PC), a branch capability, digital signal processing loop operations, support for interrupts, and provides the instruction memory control which could include an instruction cache if needed by an application. In addition, the SIW I-Fetch controller 103 dispatches 32-bit SIWs to the other PEs in the system by means of 32-bit Instruction Bus 102.

In the exemplary system of FIG. 1A, common elements are used throughout to simplify the explanation. It will be recognized that actual implementations are not limited to this restriction. For example, the execution units 131 in the combined SP/PE0 can be separated into a set of execution units optimized for the control function, e.g. fixed point execution units, and the PE0 as well as the other PEs can be optimized for a floating point application. For the purposes of this invention description, it is assumed that the execution units 131 are of the same type in the SP/PE0 and the other PEs. In a similar manner, SP/PE0 and the other PEs all use a five instruction slot iVLIW architecture which contains a VIM memory 109 and an instruction decode and VIM controller function unit 107 which receives instructions as dispatched from the SP/PE0's I-Fetch unit 103 and generates the VIM address-and-control signals 108 required to access the iVLIWs stored in the VIM 109 and identified by the letters SLAMD. The loading of the iVLIWs is described in further detail in U.S. application Ser. No. 09/187,539 entitled "Methods and Apparatus for Efficient Synchronous MIMD Operations with iVLIW PE-to-PE Communication" and filed Nov. 6, 1998. Also contained in the SP/PE0 and the other PEs is a common PE configurable register file 127 which is described in further detail in U.S. application Ser. No. 09/169,255 entitled "Method and Apparatus for Dynamic Instruction Controlled Reconfiguration Register File with Extended Precision" and filed Oct. 9, 1998. Due to the combined nature of the SP/PE0, the data memory interface controller 125 must handle the data processing needs of both the SP controller, with SP data in memory 121, and PE0, with PE0 data in memory 123. The SP/PE0 local memory and data bus interface 125 also is the source of the data that is sent over the 32-bit broadcast data bus 126. The other PEs, 151, 153, and 155 contain common physical data memory units 123', 123", and 123''' though the data stored in them is generally different as required by the local processing done on each PE. The interface to these PE data memories is also the same for PEs 1, 2, and 3 as indicated by PE local memory and data bus interface logic 157, 157' and 157". Interconnecting the PEs for data transfer communications is the cluster switch 171 further described in U.S. patent application Ser. No. 08/885,310 entitled "Manifold Array Processor" and filed Jun. 30, 1997, U.S. Application Ser. No. Nov. 08/949,122 entitled "Methods and Apparatus for Manifold Array Processing" and filed Oct. 10, 1997, and U.S. application Ser. No. 09/169,256 entitled "Methods and Apparatus for ManArray PE-to-PE Switch Control" and filed Oct. 9, 1998. The interface to a host processor, other peripheral devices, and/or external memory can be done in many ways. The primary mechanism shown for completeness is contained in a DMA control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via bus 185. All of the above noted patent applications are assigned to the assignee of the present invention and are incorporated herein by reference in their entirety.

FIG. 1B shows ManArray Scalable Instruction Set formats 10, 12A and 12B, 14A, 14B and 14C, and 16A, 16B, 16C, 16D and 16E in accordance with the present invention. In FIG. 1B, the hierarchical bit fields 11, 13, 15, and 17 are as follows:

16-bit instruction (10) 1-bit field (11), 32-bit instruction (12A and 12B) 2-bit field (13), 48-bit instruction (14A, 14B, and 14C) 3-bit field (15), 64-bit instruction (16A, 16B, 16C, 16D, and 16E) 4-bit field (17)

The hierarchical bit fields define the instruction format, mix of instruction formats, and convey additional information on the functionality of the instruction. They are not mere tag fields, but rather are utilized as part of the opcodes to define basic instruction types within each existing format. For example, the single bit field 11 in instruction format 10, used in a 16-bit instruction set architecture in the presently preferred embodiment, indicates a distinction between two types of instructions: one which includes indirect Very Long Instruction Word (iVLIW) and control instructions, and a second which includes the arithmetic and load/store instructions. In the preferred embodiment of the 32-bit instructions 12A and 12B, the 2-bit hierarchical bit field 13 indicates the separation between type-1 instructions which represent different pluggable groups of instructions and type-2 instructions made up of 3 major types of instructions labeled A, B, and C. One of the pluggable groups of instructions preferably comprises packing two 15-bit instructions into the 30-bit field allowed by the 32-bit instructions 12A. A type-2-A instruction preferably comprises the iVLIW and control opcodes, a type-2-B instruction preferably comprises the arithmetic opcodes, a type-2-C instruction preferably comprises the load/store opcodes. A full processor architecture can be defined with type-2 instructions allowing the pluggable type-1 instructions to be used to enhance the capabilities of the processor for specific application utilization. The ability to divide instructions by type is highly advantageous. In the exemplary instructions 12A and 12B shown in FIG. 1B, the 2-bit hierarchical field 13 identifies 2 instruction formats (type-1 dual 15-bit instruction format and type-2 30-bit instruction format) and further identifies three functional groupings within the type-2 30-bit format. With instruction formats 14A, B, and C, and instruction formats 16A, B, C, D, and E, up to eight and sixteen type variations are permitted by the hierarchical bits 15 and 17, respectively. In the exemplary instruction format 14A, three type-1 format instructions are packed into a 45-bit field. In instruction 14B, a type-2 instruction, one of three types of instructions labeled A, B, or C, is packed with a type-1 instruction into a 45-bit field. In instruction 14C, a type-3 instruction is defined using all 45-bits with four functional instruction groups labeled A, B, C, and D. The actual definition of the operation of an instruction is specified in a hierarchical fashion based first on the hierarchy bits and then based upon the reduced instruction fields of 15, 30, 45, and 60-bits as illustrated in FIG. 1B. For the 16 bit instructions 10, one hierarchy bit is used and the specific operations must be defined within a 15-bit field. For the 32-bit instructions 12A and 12B, two hierarchy bits are used and the specific operations are defined within a 30-bit field. With the larger 48-bit and 64-bit formats, three and four hierarchy bits are used respectively and the specific operations are defined within 45 and 60-bit fields, respectively.

While a bit or bits are shown in a specific placement within a field of bits, the hierarchy bits can be placed elsewhere in the field of bits as best suits a particular implementation. It is further possible to bit encode the hierarchy bits as in the 48-bit formats 14A, B, and C where the first bit of the 3-bit hierarchy field 15 if a "0" would represent instructions of type-1 14A or type-2-A,B,C 14B. While if this first bit is a "1", then instructions of type-3-A, B, C, and D or type 14C would be specified. This example of bit encoding within the hierarchy field bits further indicates that the first bit of the three-bit field can be separated from the other two bits within the 48bit field of bits representing the instruction. The preferred embodiment places the hierarchy bits in a group as shown.

In FIG. 1B, an additional single bit field, bit 99, is used in a preferred embodiment of the present architecture to differentiate between the array-control processor instructions and instructions for an array of processing elements (PEs). If specific instructions cannot be executed on the array for example, a branch instruction, then the bit is fixed in the controller state. This differentiation between control and PE instructions can also be done by specific bit encoding within the specific Instruction Type, allowing only specific instructions to have access to array processing. In the present implementation, when a simplex instruction is executed on the control processor, no simplex PE instruction is executing. When a simplex PE instruction is executing, no control processor simplex instruction is executing. A simplex instruction is a non-iVLIW instruction of the 16-bit, 32-bit, 48-bit, or 64-bit type. In a merged array controller with an array processing element iVLIW design, controller instructions can be mixed with PE instructions in the same iVLIW with bit 99 used to differentiate the mixed instructions. If no array of processor elements is utilized in a family of products, then bit 99 is not needed. For example, a 16-bit uniprocessor could use format 10 of FIG. 1B without a bit 99 allowing a 16-bit iVLIW processor to be easily created that fits within the overall hierarchy, while never extending it to include array processor capabilities.

Further aspects of the present invention are discussed in greater detail below. While 32-bit and now 64-bit architectures have dominated the field of high-performance computing in recent years, this domination has occurred at the expense of the size of the instruction memory subsystem. With the movement of digital signal processing (DSP) technology into multimedia and embedded systems markets, the cost of the processing subsystem has come to be dominated by the cost of memory, and performance is often constrained by the access time available to the local instruction memory associated with the DSP. Real time issues impose further constraints, making it desirable to move time-critical applications into instruction memory with deterministic access time. This memory is preferably located on-chip. Since on-chip memory is relatively expensive, the issue of code density becomes important to processor implementations.

One way in which the Manifold Array processor architecture and instruction set addresses the code density problem is by utilizing compacted instructions in accordance with the present invention. The compacted instructions are dynamically optimized by a programmer or compiler for kernel control, bit stream processing, and data setup operations which often govern the steady-state throughput of parallel signal processing algorithms. The application of compacted instructions to a very high performance parallel architecture provides a level of flexibility in target applications, from scientific processing to embedded control and signal processing, which has not been previously available. It is noted that for systems with on-chip cache, executing only 15-bit instructions effectively doubles the size of the instruction cache, and from the standpoint of the memory controller, cuts the required instruction bus bandwidth in half for sequential execution. The fact that the architecture integrates the compacted instructions seamlessly makes it a much better solution than attaching a control-oriented processor to a separate DSP with the inherent processor to processor communication overhead involved.

Two forms of 15-bit compacted instructions will be discussed. The first form specifies a basic compacted instruction set based upon a fixed direct translation process to convert the 15-bit compact format into a 32-bit format, as illustrated in FIGS. 2–5. The second form of 15-bit compacted instruction specifies the preferred dynamic VIM translation mechanism for creating compacted instructions, as illustrated in FIGS. 6–8.

The first form of 15-bit instruction set 201, shown in FIGS. 2A and 2B, provides a fixed-in-hardware subset of instructions selected from the full processor complement of operation types to allow many control or scalar-oriented tasks to be coded almost entirely with these instructions. The second preferred form dynamic compacted instruction set 601, shown in FIGS. 6 and 6A, is not fixed in hardware and is designed to provide full freedom of choice of instructions from the fall architecture by a programmer and or compiler type of tool to allow code density optimization on a task by task basis. In addition, the second form dynamic compacted instructions are simple to implement in an iVLIW processor and the concept is extendable to both the array controller SP and PEs in an array processor thereby extending the compacted instruction set for use in general parallel signal processing code. Further details of the preferred first form for use with the ManArray architecture are shown in FIGS. 2A and 2B. FIG. 2A illustrates how sequential execution order may be specified by position within a 32-bit instruction word 201, and FIG. 2B illustrates an exemplary grouping of form 1 compacted instructions. Similarly, FIG. 6 illustrates how sequential execution order may be specified by position with a 32-bit instruction word 601, and FIG. 6A illustrates an exemplary grouping of form 2 compacted instructions. In both FIG. 2A 201 and FIG. 6, two 15-bit instructions may be packed per 32-bit instruction 201 or 601, respectively as shown. Since these compacted instructions are integrated into the instruction set in a hierarchical manner, due to the two high order bits 13 as shown in FIG. 1B for instruction 12A which correspond bit-30 and bit-31 of the instructions 201 and 601, there is no mode change required between executing a compacted instruction or any of the other instructions. The compacted instructions can be seamlessly intermixed with any of the other instructions in the processor. This approach allows for a powerful but very small on-chip program kernel consisting primarily of compacted instructions along with a set of common support routines for data transfer and communication.

Some of the advanced ManArray compute and communicate instructions are only available in 32-bit form since they may not be easily subsettable. This is not of great impact since the forms of instructions typically chosen for compacted implementation include many of the common instructions used to support control type programs, though with some utilization constraints due to the reduced instruction format. Both forms of the presently preferred ManArray compacted instruction sets are based upon the following rules:

1. All the compacted ManArray instructions are subsets of 32-bit instructions. There are no unique compacted instructions.
2. All ManArray compacted instructions are always fetched in pairs, never individually.
3. All ManArray compacted instructions are primarily for improving control code density.
    Form-1, direct translation, compacted instructions are considered SP controller instructions unless explicitly defined in the compacted instruction.
    Form-2, VIM translation, compacted instructions can be both SP controller and PE instructions.
    A standard prior art approach taken with compressed instructions is to decompress them directly to their uncompressed counterpart instructions prior to execution. With this prior art approach, there typically is a limitation placed upon the compressed instructions caused by the compression process to limit the number of bits in the compressed format. For example, the number of registers visible to the programmer using packed or compressed instructions is usually restricted in the compressed instruction format. Specifically, in ManArray architecture the processor registers are preferably divided into 3 register files:

CRF—the Compute Register File contains a 32×32-bit register file, designated R0–R31 or alternatively a 16×32-bit register file, designated RO–R15.

ARF—Address Register File contains 8×32-bit address registers intended to contain base and index values. These registers are designated A0–7 or Ae (Aeven=A0, 2,4,6) and Ao (Aodd=A1,3,5,7) respectively.

MRF—Miscellaneous Register File contains 24×32 bit-control and configuration registers designated generally as M0–M23.

Each PE, such as PE151 of FIG. 1A, preferably contains a full CRF and ARF but may contain only a small number of miscellaneous registers as compared to the SP/PE0 101 of FIG. 1A. Due to the restricted number of bits available to encode a compressed instruction, a subset of the full architecture register space is all that can be specified in a 15-bit format. In both forms of compacted instructions, 3-bit fields are used to identify different register operands. Each forms of compacted instructions provides the capability to go beyond this limitation using a unique translation mechanism appropriate for each form.

Form 1 Compacted Instructions

In form-1 compacted instructions 301, the 15-bit instructions are available in the following four major categories and defined by the two high order bits of either 15-bit position, bits-14 and 13 or bits-29 and 28, in the 32-bit packed instruction word, as shown in FIGS. 3A–3D. The presently preferred form-1 compacted instruction formats are generally shown in FIGS. 3A, B, C, and D.

1. Multiply, Divide, Bit Operations, Extract, and Permute 302, FIG. 3A:
2. Control and VLIWs 303, FIG. 3B;
3. Load and Store 304, FIG. 3C; and
4. ALU and DSU 305, FIG. 3D.

The specific functionality of each compacted instruction is not shown since it would not provide any new insights to the inventive concepts being described in this application. Rather, the instruction formats and a selected example will be shown demonstrating the basic concepts followed on all form-1 compacted instructions. The specific details of the form-1 compacted instruction formats, also referred to as compacted-1 instruction formats, is addressed immediately below.

The compacted Multiply, Divide, BitOps, Extract, and Permute Instructions 302 are shown in FIG. 3A. These comprise an integer multiply low (MPYL) 310, an integer divide (DIV) 311, nine basic types of bit operations 312, three forms of Extract 313–315, and a Permute instruction 316. These instructions are specified by either bits-12-9 or bits-27-24. Bits 8-0 or 23-15 are specific to the instruction types, but it is noted that only 3-bits are allocated for register file specification. The EXTIL 314 and EXTIS 315 forms have additional restricted register usage specified as shown in FIG. 3A.

The Control and iVLIW instructions 303 shown in FIG. 3B consist of a Loop instruction 320, a Return from Interrupt (RETI) 321, an unconditional Jump instruction (UcJMP) 322, a conditional Jump instruction (JMPcc) 323, two iVLIW instructions (SPXV and PEXV) 324 and 325, and a special instruction class consisting of a parallel NOP and a sequential NOP 326 as well as reserved instruction space 327. These instruction types are specified by bits-12-10 or bits 27-25. Bit-9 or bit-24 of Loop instruction 320 is a loop control register select bit (LCR). In conditional Jump instruction 323, for bits-8 and 9 or bits-24 and 23 "Z" represents zero and is designated by both bits set to zero "00"; "GT" represents greater than and is designated by these bits set to "01"; "T.op" represents execute if True and is designated by these bits set to "10"; and "F.op" represents execute if False and is designated by these bits set to "11". Of the form-1 compacted instruction set, only the PEXV instruction can be executed in the PEs in an array.

The goal of the packed Load/Store instructions 304 of FIG. 3C is to provide high-density code for moving data between SP registers and memory and PE registers and their local PE memories. In particular, these instructions facilitate rapid context switching for the kernel, and efficient data load/store operations for application tasks. The priorities for selecting load/store addressing modes have been established in the following order:

1. Minimize on-chip code size for bulk loads and stores
2. Provide addressing mode flexibility
3. Provide for accessing multiple memories
4. If possible, address multiple data types (word, half-word, byte)

The presently preferred load and store compacted-1 instructions 304, as shown in FIG. 3C, have the following addressing modes specified:

Base+Index with pre-decrement or post increment functions
Indirect with pre-decrement or post increment functions
Base+Displacement
Load Immediate (LIM)
Load Table (LTBL)

Bit-10 or bit-25 designated "ind" in FIG. 3C when set to "0" designates either indirect or indexed operation as further defined by bit-8 or bit-23. Bit-9 or bit-24 when set to "0" specifies a 32-bit word (W) operation, and when set to "1", a 16-bit low order half-word (H0) operation.

Bit-8 or bit-23 set to "0" designates Address Register-0 (A0), and when set to "1" designates Address Register-1 (A1).

The compacted ALU and DSU instructions 305 are shown in FIG. 3D and consist of Add 340, Add immediate (Addi) 341, Subtract (Sub) 342, Subtract inunediate (Subi) 343, logical operations AND, OR, NOT, and XOR 344, 32-bit word compare 345 and compare immediate 346, 32-bit word shifts and 32-bit word rotates 347, and copy 348. These instruction types are specified by bits 12-10 or bits 27-25. The compacted-1 copy instruction 348 allows any of the 32 CRFs, 8 ARFs, or 24 MRFs to be copied to a target register in the CRF as specified by the compacted register bank and the compacted Rt field. The compacted-1 copy instruction 348 also allows any CRF register as specified by the compacted register bank and the compacted Rs field to be copied to any of the 32 CRFs, 8 ARFs, or 24 MRFs. Further, for instructions 341, 343 and 346, bits-7-3 or bits-22-18 are an unsigned immediate 5-bit value (UIMM5).

The control instructions of FIG. 3B, and the copy to the MRF and ARF instructions 348 of FIG. 3D are primarily designed for system configuration and control functions, in addition to some branch and execute VLIW instruction types. Obtaining a balanced compacted instruction set architecture is difficult since the best choice of instructions to have in compacted form typically varies depending upon the application program. This particular difficulty will be addressed in more detail with the preferred second form of the ManArray compacted instructions.

The register file limitation of a 3-bit operand specification within the 15-bit formats is addressed next. In the ManArray compacted-1 instruction set, the register file limitation, is minimized significantly by the addition of a translation mechanism placed between a received 15-bit compacted-1 instruction and the translated 32-bit instruction to be executed. The registers specified by one of the compacted-1 instructions can be treated as an offset from a register base address. Since 3-bits are allocated in the compacted instruction format for operand register specifications, groupings or banks of $2^3$ register addresses can be specified. For example, with a 32×32 logical register file space, specified in uncompressed instructions using 5-bit register fields, only two high order bits are required to be concatenated to the compacted register 3-bit fields to allow the 32×32 register file to be operated on as four banks of 8 registers in each bank.

Figure 4A:
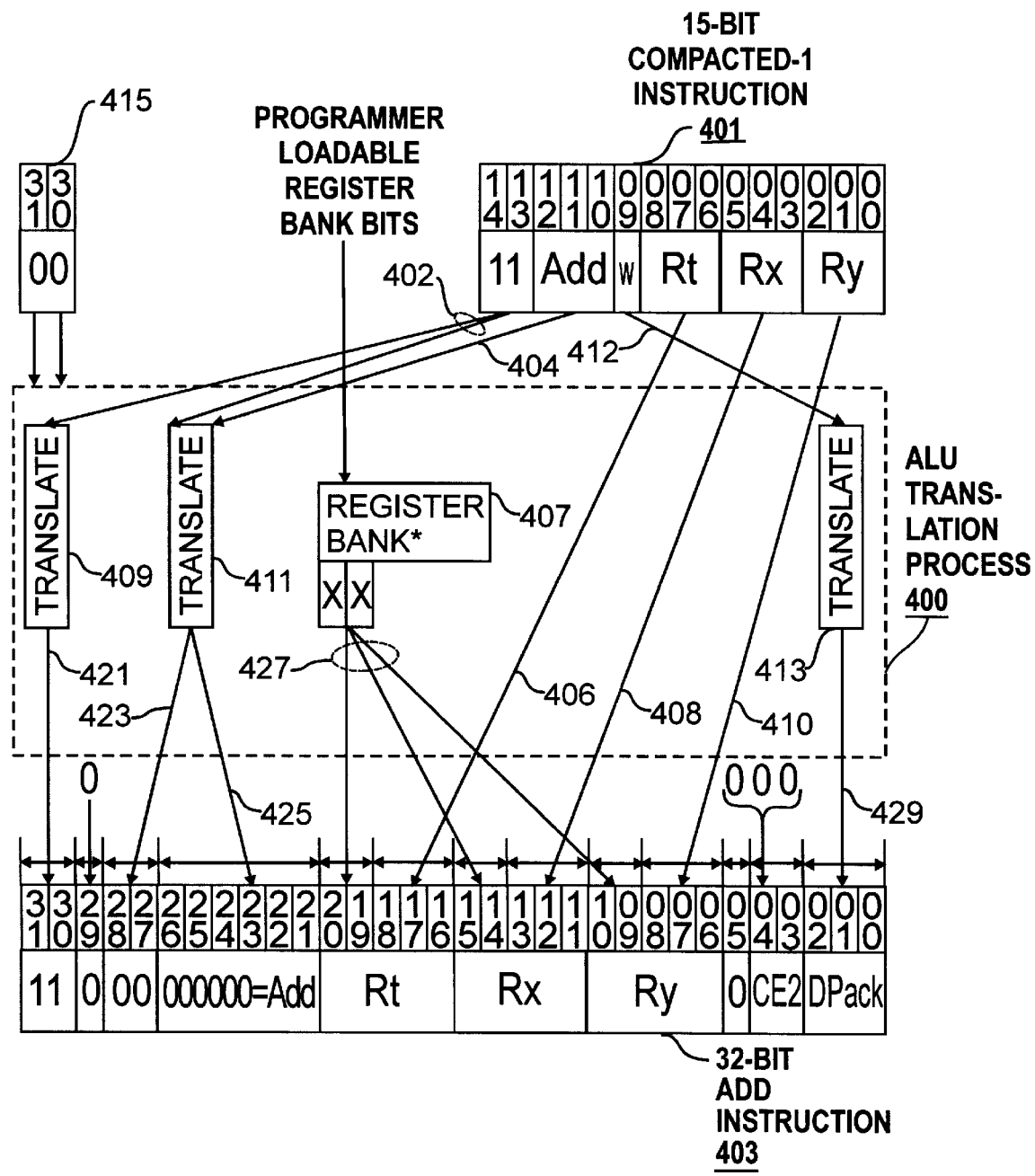
FIG. 4A illustrates a 15-bit to 32bit ALU translation operation.
Figure 5:
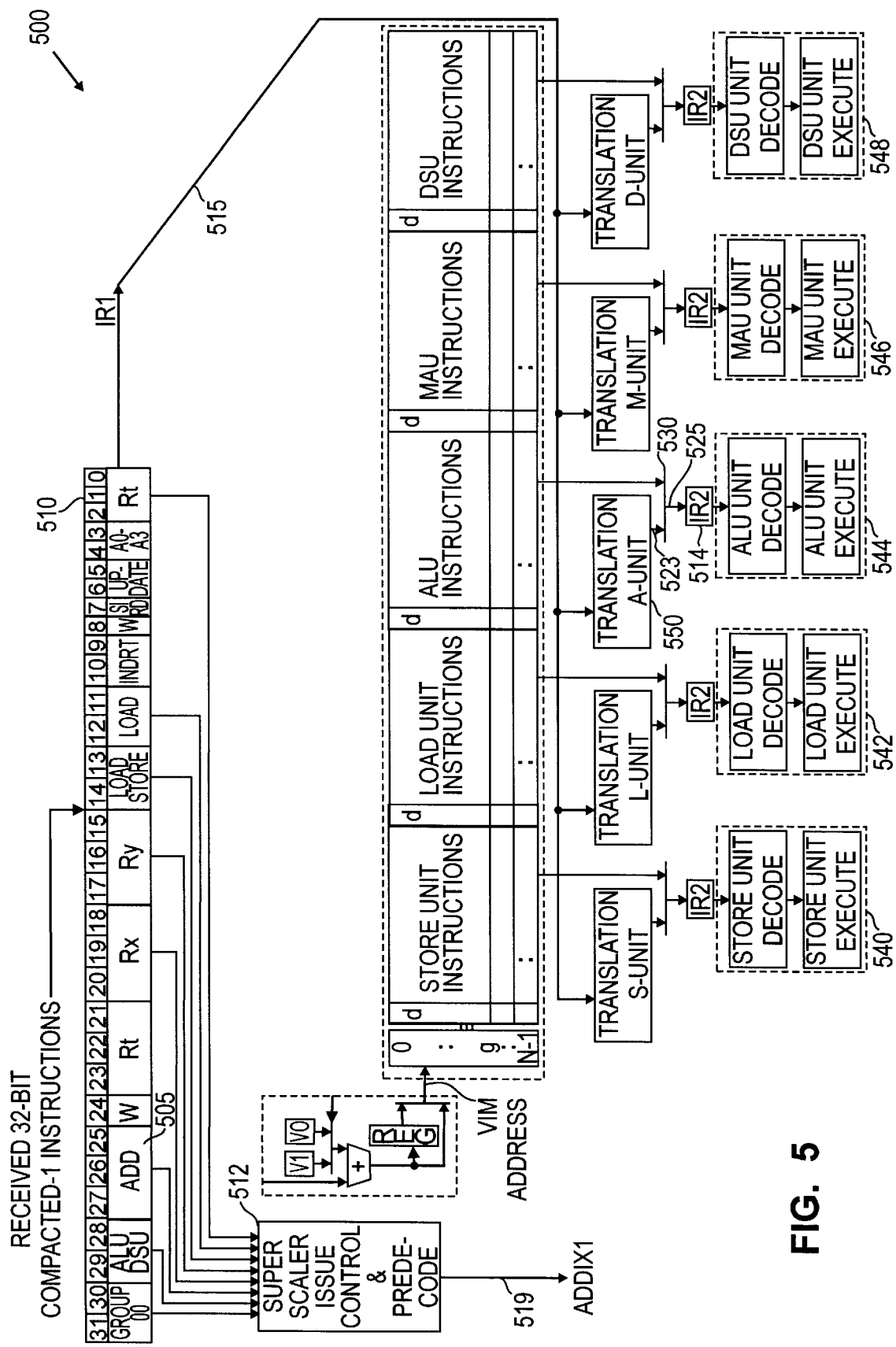
FIG. 5 illustrates a first form of a compacted instruction data path.

An example demonstrating the translation process for a sequentially executed compacted instruction is illustrated in FIG. 4A. FIG. 5, shows a high level view of the data path followed for compacted-1 instructions and is discussed below in conjunction with the description of FIG. 4A. It is noted in FIG. 5 that each functional unit, Store 540, Load 542, ALU 544, MAU 546, and DSU 548 requires its own translation mechanism. This example illustrated in FIG. 4A will focus on the ALU path for an Add instruction. Beginning in FIG. 4A, the 15-bit compacted instruction 401 is translated via process 400 to the 32-bit instruction 403 prior to execution. In FIG. 5, the 32-bit compacted-1 instruction is received into the Instruction Register-1 (IR1) 510. The outputs of the IR1 register 515 of FIG. 5, corresponds to register 401 in FIG. 4A, are available at the translation A-Unit box 550 in FIG. 5 which corresponds to the translation process 400 of FIG. 4A. This example assumes that a compacted instruction in the $2^{nd}$ position as depicted in FIG. 5 is being translated for execution. The Add instruction 505, bits 29-25 are predecoded by predecoder 512 of FIG. 5 generating a number of control signals of which one Add×1 519 is shown. The translation process is shown in more detail in FIG. 4A. To accomplish the translation operation, an architected 2-bit compacted base address register 407 (Register Bank) is utilized to expand the Rt, Rx, and Ry register addresses. For the 32×32-bit compute register file (CRF), four banks of 8 registers can be specified by the programmer for processing. If the compute register file is smaller, e.g. a 16×32-bit file, then two banks of 8 registers can be specified. If the CRF is larger, e.g. a 64×32-bit file, then 8 register banks can be specified. This register 407 is initialized to zero, on power on for example, specifying the default register bank is R0–R7. Register 407 represents part of the context of a task that is in execution on the processor and needs to be saved on context switch operations. All register operands are treated in a similar manner where the compacted instructions format is a subset of the available register capacity.

In FIG. 4A, there are three translate blocks 409, 411, and 413, which allow simple fixed translations to a known state for a given instruction mapping. For example, the group code bits 30 and 31 for the dual compacted instructions 415 are 00 which enables the translation process logic 400. The 15-bit compacted instruction format bits 13 and 14 402 must be translated to the proper group code bits 30 and 31 in the corresponding 32-bit uncompressed format 403 through translation block 409. In the Add example presented in FIG. 4A and FIG. 5, the operation code (opcode) is specified in bits 10, 11, and 12 of instruction 401 of FIG. 4A and bits 25, 26, and 27 of instruction 510 of FIG. 5. These bits 404 are used in conjunction with bits 13 and 14 402 to specify bits 21 through 28 in the 32-bit Add Instruction through the translation block 411. The data type bit 9 412 is sent to translation block 413 to specify the Dpack bits 0 to 2 in the 32-bit Add Instruction 403. The CE2 field of bits 3 and 4 in 32-bit Add Instruction 403 are specified to be "00" that corresponds to the unconditional execute option of the conditional execution architecture. The SP/PE bit 29 in instruction 403 is always loaded with the SP only flag (0) in this example. In the case of the PEXV compacted instruction 325 shown in FIG. 3B, the SP/PE bit 29 in instruction 403 of FIG. 4A is set to a "1" based upon a translation of the opcode field bits 10-12 of instruction 401 in conjunction with the function type field bits 13 and 14 of instruction 401. At the end of the translation process a 32-bit instruction 403 of the form shown in FIG. 4A has been formed. This output is shown in FIG. 5 as the output 523 of the Translation A-Unit box 550. For compacted-1 instruction execution, the multiplexer 530 of FIG. 5 is enabled, via a pre-decode signal, to pass the translation A-Unit output 523 as its output 525 which is input to the IR2 register 514. In the processor pipeline, the ALU instruction is then executed in the ALU decode and execution unit block 544.

Figure 4B:
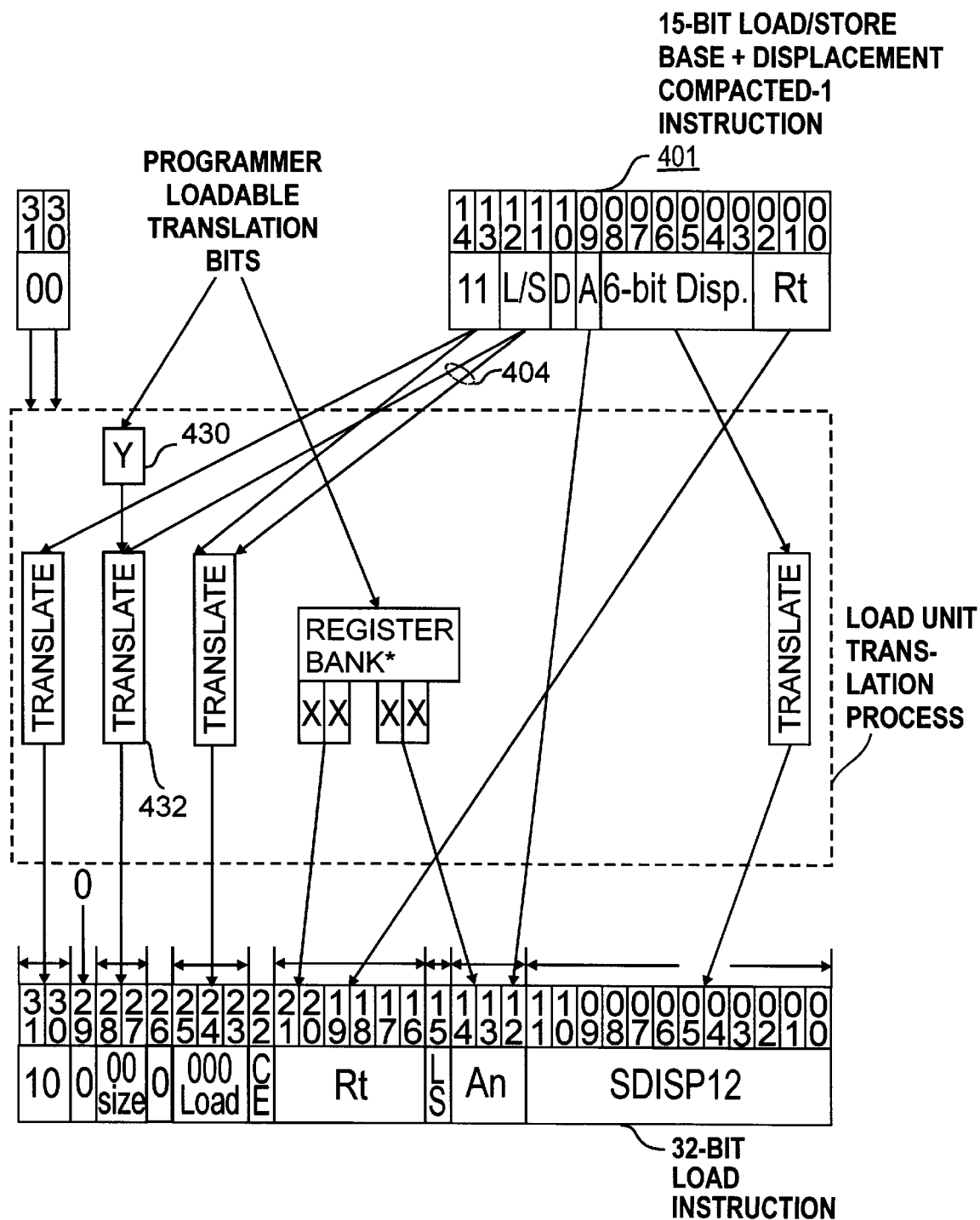
FIG. 4B illustrates a 15-bit to 32-bit Load Unit translation operation.

FIG. 4B shows a translation mechanism for the Load Unit with another approach that extends the previous translation options presented for the ALU in FIG. 4A. This extension is that the programmer loadable translation bits can take part in the translation process and not just be used directly as shown for signals 427 in FIG. 4A. In FIG. 4B, a new bit labeled "y" 430 is an input to the translation function 432 for the size field where the size is dependent upon the instruction type specified by bits 404. This approach allows some of the load instructions data type selection to be dependent upon the programmer loaded "y" bit while other compacted load instructions are allowed to be independent of this bit and use a fixed data type as defined by the compacted instruction bit encoding. For example, a single bit "y" 430, as shown in FIG. 4B, can specify two data types, say for example a 32-bit word or a 16-bit half-word data type, which is useful for general load instructions except for a load immediate instruction. A load immediate, instruction LIM may be defined as shown in FIG. 3C, to load only an 8-bit byte to the b0 byte position. When translating the LIM instruction, the "y" bit 430 would be ignored. With the encoding shown in FIG. 3C, the use of a separately loadable "y" bit 430 would remove the need for bit 9 or bit 24 in the FIG. 3C formats allowing the extra bit, bit 24 or bit 9 to be used for other purposes. For example, the extra bit could be allocated to increase the update field from two bits to three bits in FIG. 3C or the 5-bit displacement field to be increased to 6-bits as shown for exemplary instruction 401 of FIG. 4B.

Figure 4C:
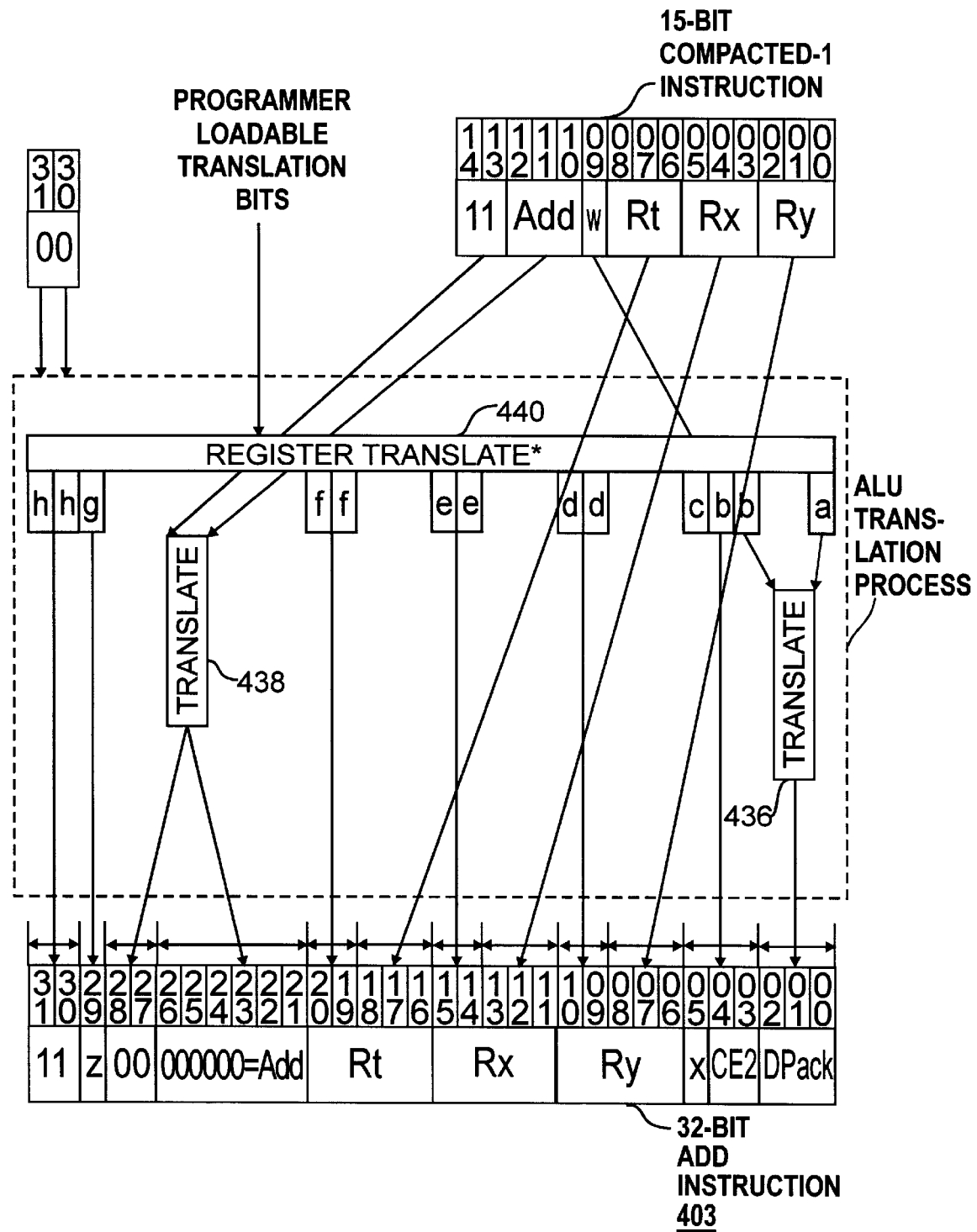
FIG. 4C illustrates a 15-bit to 32-bit Generalized ALU translation operation.

The translation process can be generally extended as shown in FIG. 4C where the 15-bit to 32-bit translation function is expanded to provide more general translation capabilities. In FIG. 4C, each register field, Ry, Rx, and Rt, is individually extended by separate register bank bits "dd, ee, and ff", 440 respectively. Other bits may be loaded in a similar manner such as "a" for the Dpack translation 336, "cbb" for the conditional execute "xCE2" three bit field, and "ghh" for bits 29-31 of instruction 403.

VIM Translation Compacted Type-2 Instructions

The determination of which instructions to include in a compact instruction set depends upon a variety of design constraints due to the variable nature of applications. For example, MPEG video processing will contain not only control code but sections of code that are highly sequential in nature such as Huffman encoding and decoding functions. In a different application, different control code and different forms of sequential code will be encountered. Due to this variance in sequential and parallel code, a different set of instructions may be advantageously selected for a compact instruction set implementation in order to better optimize code density for each application. A balanced set of compact instructions may not provide good density and performance characteristics in any specific application due to the compromises made in the instruction selection process.

A second form of ManArray compacted instructions also referred to herein as form-2 or compacted-2 instructions, address this problem directly by allowing compacted instructions to be dynamically constructed and plugged into the processor by a programmer on a task by task basis. The ManArray preferred compacted-2 instructions can be easily generated by a specialized programmer tool that can be run after the functionality of uncompressed code has been proven to create compacted code based upon the actual application. This approach enhances the primary purpose for the compacted instruction set which is namely to improve code density in the final product code. Even though assembler programming in compacted code is not precluded, it is not anticipated as being a requirement. The use of an enhanced tool to support application analysis and the instruction selection process, however, is deemed advantageous.

As can be seen from the previous compacted-1 instruction set discussion, a translation process has been defined which is based upon special separate loadable registers. These registers are required in general one per execution unit and in extended generalized form multiple translation registers could be required per execution unit. Providing additional translation registers is costly unless there already exists this storage capacity and utility elsewhere in the ManArray system. This happens to be the case due to the ManArray indirect VLIW architecture with separate VIMs in the controller SP and in each of the PEs. By using the indirect VLIW approach with a VIM that has been partitioned into separate VIM sections, one per execution unit, the VIMs can be used to hold the programmer loadable translation bits. In this case, the translation bits are contained in the actual instruction stored at a VIM address that is to be modified and then executed. This is very different than for the compacted-1 instructions since in the compacted-1 case the compacted instruction opcodes are translated directly to a 32-bit form. Due to the restricted number of bits available for the compacted-1 instructions, a subset of the full 32-bit architecture had to be chosen for implementation in compacted form. In the compacted-2 form, the bits that define the compacted instruction are used to select which functional unit VIM is to be addressed. Bits from a predetermined field of bits in the compacted-2 format are used as address offset bits to be added to a Vb base register to generate the specific VIM address desired. Since each VIM address contains a full 32-bits for instruction storage, instructions from the full ManArray architecture can be selected to act as templates for the compacted instructions created at execution time. The translation mechanism is general in that a compacted instruction provides a VIM address that selects a general 32-bit instruction the programmer previously loaded. This selection mechanism by itself is not sufficient since the number of VLIWs needed would be large since all the bit fields in the instructions stored in VIM are fixed once loaded. By selecting bit fields that would change frequently, such as register operands, and letting the compacted-2 instructions provide these bit fields, the number of VLIWs needed in support of the compacted instructions is substantially reduced. The use of available VIM for compacted instruction formation allows the compact instruction forms to be determined on a dynamic basis using the basic logic and memory already included on chip. The translation mechanism can be simplified by having a consistent approach across all instructions and all execution units. The consistent approach is to replace bit field sections of VIM instructions with bit fields from the compacted-2 instructions.

The translation process becomes one of simply choosing the correct multiplexed path depending upon the instruction being executed. It is noted that the VLIWs are not unduly proliferated since the main fields that change frequently are the ones that are mapped out, such as the already mentioned register operands. This approach allows the full ManArray architecture to be open for compressed instruction forms. Further, the compacted-2 instructions are not limited to just the controller SP, but rather can be dispatched to all PEs. The instructions stored in VIM in each PE and SP contain the SP/PE bit which determines where the instruction can be executed. The PEs require additional logic to support the sequencing of two compacted instructions of course but this logic is relatively small. In this way, all code can take advantage of the compacted instruction set not just control code.

FIG. 6 depicts the general format for the compacted-2 instructions. It is noted that the sequential execution order is the same as in FIG. 2A. The compacted-2 eight instruction groupings of FIG. 6A are determined by the high three bit fields of each 15-bit instruction, namely bits 29-27 and bits 14-12. An exemplary compacted-2 instruction format 610 is shown in FIG. 6B. In this new format, bits 14-12 or bits 29-27 determine the basic compacted instruction type, of which the 3-bit field allows the specification of 8 types. For the format shown in FIG. 6B, a Store 611, a Load 612, an ALU 613, and a MAU 614 type are defined along with two DSU types 615 and 616 and two Control types 617 and 618. Bits 11-9 or 26-24 define the function specific VimOffs address offset field with an implied Vb=V0 single VIM base address register. The function specific VimOffs three bits 11-9 allow for up to eight unique instructions to be stored at the eight VIM addresses relative to at a given Vb base address. Each functional unit has the same capability. By loading Vb with a new value, multiple independent sets of compacted instruction types can be specified. It is noted that the addressing mechanism can be extended to allow for a separate Vb base address register per execution unit VIM. Bits 8-0 or 23-15 are instruction specific but basically contain designations of which fields of the instruction stored in VIM are to be mapped out using the bits contained in the compacted-2 instruction forms shown in FIG. 6B. For example, with an ALU instruction 613, the condition code (CC) or register target (Rt) field bits (bits 8-6 or 23-21) are sourced by the compacted-2 instruction rather than from the instruction stored in the ALU VIM. The compacted type-2 form 620 of the control instructions shown in FIG. 6C are of the basic same form as defined for the type-1 compacted instructions of FIG. 3B. This is due to there not being a control VIM in the ManArray architecture though one could be provided.

Figure 6D:
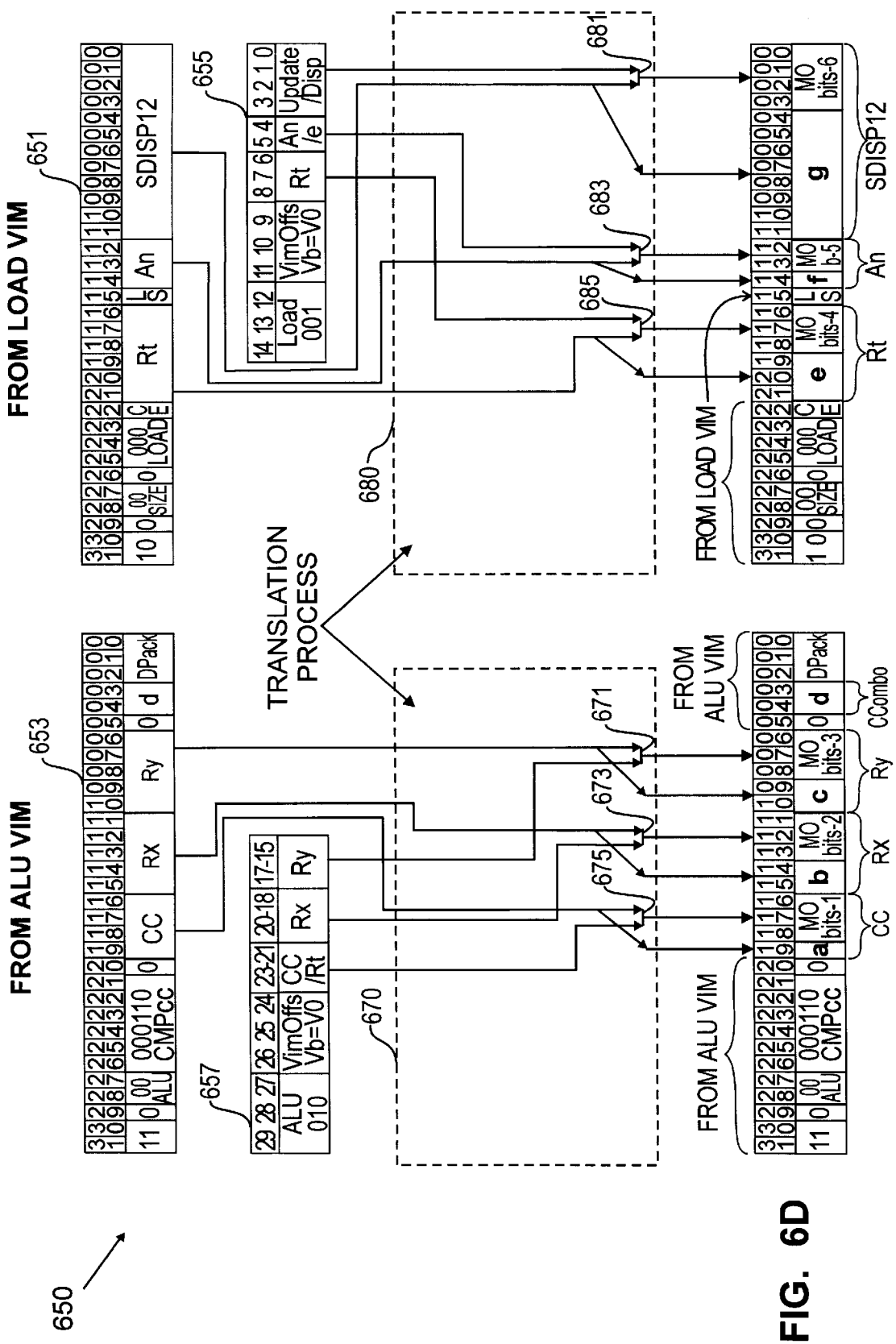
FIG. 6D illustrates two 15 bit to 32 bit VIM translation operations.

The compacted-2 translation process is shown in FIG. 6D wherein two compacted instructions 655 and 657 are shown. The basic translation process only requires the mapping out of the specified fields as shown in the translation process boxes 670 and 680 with the multiplexers 671, 673, and 675 in process box 670 and multiplexers 681, 683, and 685 in process box 680. The VIM translation process allows the whole arithmetic and load store portion of the instruction set to be used for the dynamic determination of the compacted instruction set.

Figure 7A:
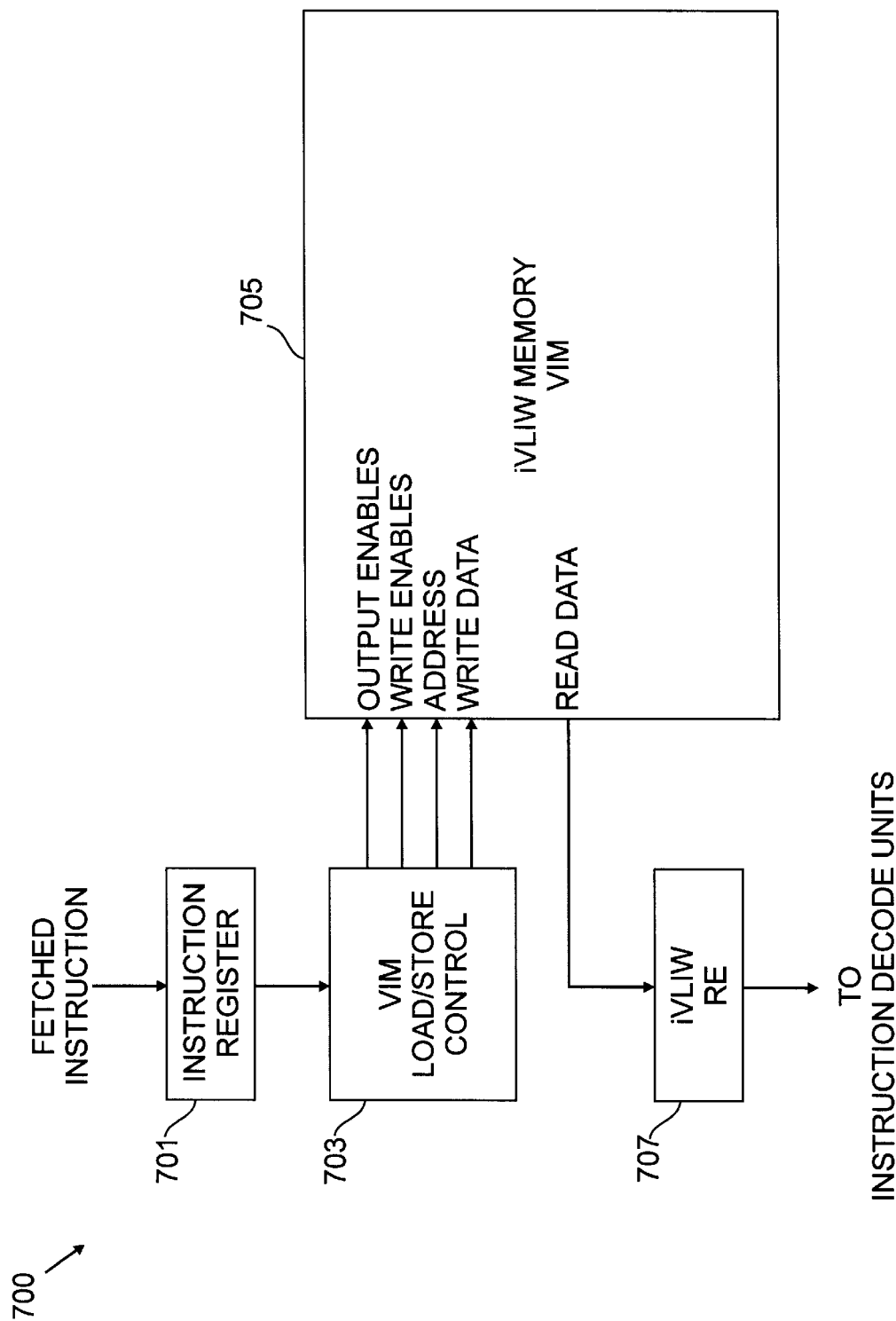
FIG. 7A illustrates an iVLIW data path.
Figure 8:
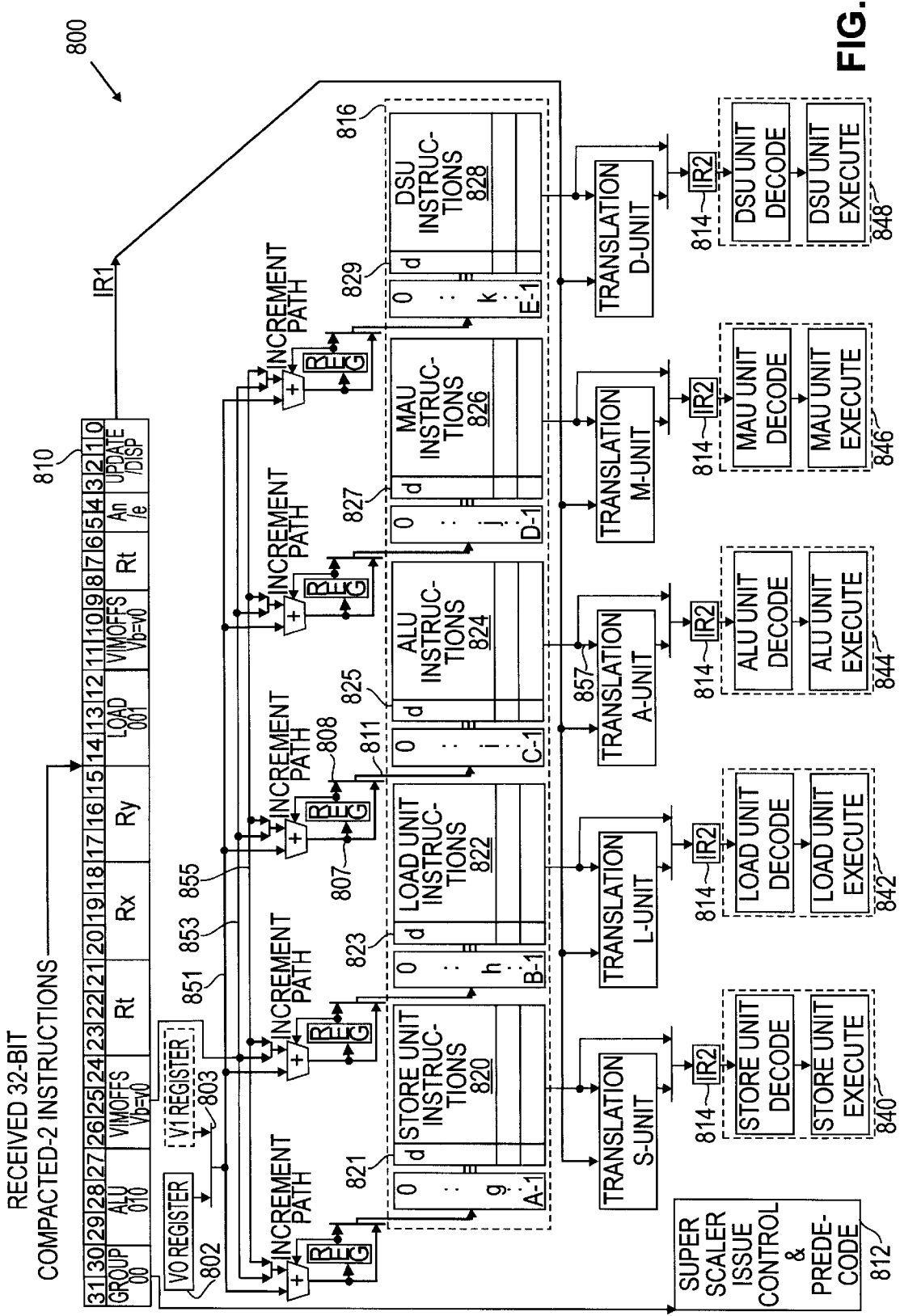
FIG. 8 illustrates the VIM translation compacted-2 instruction data path.

FIG. 7A shows a basic iVLIW data path 700 in which a fetched instruction is stored in an instruction register 701 which is connected to a VIM Load and Store Control function 703. The VIM Load and Store Control function 703 provides interface signals to a VIM 705. The output of the VIM 705 is pipelined to an iVLIW register 707.

An LV2 instruction 755 is shown in FIG. 7B. The LV2 encoding arrangement 750 consists of a CtrlOp field, bits 25-28, that represents the LV2 instruction opcode, a Load Instruction bit-23 that specifies if at least one instruction is to be loaded or if the disable d-bit for the specified address is to be loaded. Bit-22 is the disable d-bit that is loaded. Bits 18-21 specify that up to 16 instructions are to be loaded in the specified functional unit's VIM, indicated by bits 15-17. The instructions begin loading at the address generated by the addition of an address value located in one of two Vb registers, selected by bit-9, plus the VIMOFFS offset address, bits 0-7. Further details of the syntax/operation of instruction 755 are shown in syntax/operation block 760.

In FIG. 8, a composite VIM 816 is divided up into separate VIM sections 820, 822, 824, 826, and 828, each of which is associated with a functional decode-and-execute unit 840, 842, 844, 846, and 848, respectively. Each of the VIMs' address maps are divided into multiple 3-bit addressable sections as governed by the offset field included in compacted-2 instructions with a separate offset that can be specified for each VIM slot section. This VIM configuration addressing mechanism consisting of a Vb register 802, adder incremented 804, multiplexers 806 and 808, provides the ability to independently select instructions within a 3-bit address range in each functional VIM. For the compacted type-2 instructions, it is assumed that the iVLIWs have been loaded into this new partitioned VIM by use of the Load VLIW-2 instruction 755, LV2 of FIG. 7B.

Referring again to FIG. 8, the VIM 816 consists of multiple independent memory units each associated with their own functional decode and execute units. Independent addressing logic is provided for each slot VIM. As illustrated in FIG. 8, each composite VIM entry preferably consists of five 32-bit instruction slots (one per execution unit). Associated with each instruction slot are additional state bits, of which 5 are shown (one d-bit per slot). Included among the five execution units are a Store Unit 840 associated with Store Instruction VIM 820, Load Unit 842 associated with Load Instruction VIM 822, an Arithmetic-Logical Unit (ALU) 844 associated with ALU Instruction VIM 824, a Multiply-Accumulate Unit (MAU) 846 associated with MAU Instruction VIM 826, and a Data-Select Unit (DSU) 848 associated with DSU Instruction VIM 828.

The five state d-bits 821, 823, 825, 827, and 829 are LV-loaded disable bits for the instruction slots that indicate either: the instruction slot is available-for-execution or it is not-available-for-execution. A binary value suffices to distinguish between the two states. An instruction slot with its d-bit set to the not-available-for-execution state is interpreted as a NOP (no-operation) instruction by the execution unit. In addition, the appropriate d-bit for that functional slot position is loaded into bit-31 of that slot. The d-bits are primarily used for 32-bit execute VLIW (XV) operations.

The FIG. 8 VIM address adder functional blocks, as exemplified by ALU VIM address adder 804, are used to support the VIM address increment capability required by the Load VLIW-2 (LV2) instruction 755 of FIG. 7B as described in Syntax/Operation block 760. This capability allows the instructions following the LV2 instruction to be loaded at:

(V[01]+VIMOFFS)[UnitVIM]←1$^{st}$ Instruction following LV2

(V[01]+VIMOFFS+1)[UnitVIM]←2$^{nd}$ Instruction following LV2

.

.

.

(V[01]+VIMOFFS+InstrCnt)[UnitVIM]←(InstrCnt)$^{th}$ Instruction following LV2.

The V[01] syntax indicates which Vb base register is to be selected, either V[0] or V[1] selectable by the programmer/tool. The instruction count InstrCnt is a binary coded number, 0 thru F, that represents from 1 to 16 instructions that can be loaded into up to 16 consecutive UnitVIM locations.

In FIG. 8, the operation of the compacted-2 instruction pipeline is as follows. A received compacted-2 instruction is loaded into the Instruction Register 1 (IR1) 810. The output of IR1 is pre-decoded by predecoder 812 early in the pipeline cycle prior to loading the Instruction Register 2 values (IR2) 814. Upon receipt of the compacted type-2 instruction in IR1 810, two VIM addresses are calculated in parallel. The calculations differ for each VIM slot section due to each having its own offset value as set by the two compacted instructions. Each Vim slot calculation is of the form Vb+0extend{unitOFS[3]} where Vb represents one of two VIM address registers, and 0 extend aligns the 3-bit (unitOFS[3]) value with the extent of Vb. For example, the ALU VIM's address 811 is calculated by Vb+0extend{ALUVIMOFS[3]}, where the Vb value is V0 802 by definition made available through multiplexer 803 on bus 851 to adder 804. The addition is accomplished by adder 804, the ALUVIMOFS[3]=R1 bits(26, 25, 24) which are made available on bus 853 through multiplexer 806 and then connected to adder 804. The adder 804 output 807 is passed through multiplexer 808 to create the ALU VIM slot address 811. The zero extend logic is not shown for clarity. Once the VIM addresses are generated, the appropriate instructions are read out of their VIM and sent to their translation units, e.g., ALU VIM output 857. The compacted-2 instruction operation takes one execute cycle to complete, though pipeline considerations must be taken into account based upon the individual simplex instructions in each of the slots that are executed.

Pipeline

Implementation requirements and the technology process may affect the operation of the processor pipeline for compacted instructions. For example, with a reasonable cycle time and process technology a fetch-decode-execute pipeline may be adequate to accommodate the expansion of the compacted instructions during the decode phase of the pipeline. This would be described as a Fetch-{(Translate if compact instruction)/Decode}-Execute pipeline. In this scenario, it is determined whether the fetched instruction is a compacted instruction or not. If the instruction is a compacted instruction, then it is first expanded to its corresponding 32-bit format by translating bits and substituting register bits as required. After the expansion, the instruction is decoded as a normal 32-bit instruction. Alternatively, if implementation requirements or technology processes do not allow the previous pipeline definition, an additional pipeline phase can be incorporated in the processor design changing the three phase Fetch-{Translate/Decode}-Execute pipeline to a four phase fetch-translate-decode-execute pipeline. The fetch-translate-decode-execute pipeline is used in the examples shown in FIG. 5 and FIG. 8. It is noted that the compacted instruction set concept does not in and of itself preclude the use of other forms of pipeline.

Tied in with the pipeline is the capability to execute a single 15-bit instruction at a time or two 15-bit instructions at a time. The method to determine the parallel execution is done by the hardware in an automatic fashion based upon simple execution rules. An exemplary set of execution rules are as follows:

Execute the two compacted instructions sequentially if:
  Both instructions are of the same execution unit type,
  Either instruction is a Control/iVLIW type,
  Either instruction is a Copy to/from ARF or MRF,
  The 1$^{st}$ position compacted instruction's Rt is used as a source register for the compacted instruction in the 2$^{nd}$ position,
  If either compacted instruction is a 15-bit NOP then based upon the type of NOP (bit 7 FIG. 3B) then execute the two compacted instructions sequentially or in parallel, Else, execute both compacted instruction in parallel.

It is noted that some of these rules can be enforced by the programmer, such as the "The 1$^{st}$ position compacted instruction's Rt is used as a source register for the compacted instruction in the 2$^{nd}$ position," rule. A mode bit control could also be used in conjunction with these rules to specify whether all the compacted instructions are to be executed sequentially or whether parallel execution is enabled. It is noted that executing two compact instructions in parallel causes two 32-bit instructions to execute in parallel, providing VLIW performance to compacted instruction code.

While the present invention has been described in a presently preferred embodiment, it will be recognized that a number of variations will be readily apparent and that the present teachings may be widely applied consistent with the foregoing disclosure and the claims which follow.

We claim:

1. A process for direct translation of a 15-bit compact instruction into a 32-bit format comprising the steps of:
  receiving the 15-bit compact instruction;
  determining from an opcode bit field of the 15-bit compact instruction the functional type of translation required; and
  utilizing a translation processor to incorporate bits from the compact instruction in translating the 15-bit compact instruction into a 32-bit format.

2. The process of claim 1 further comprising the step of:
  utilizing a programmer loaded bit to allow data type selection dependent upon the programmer loaded bit.

3. The process of claim 2 wherein the programmer loaded bit operates to specify two data types, one for a 32-bit word and the other for a 16-bit half-word.

4. The process of claim 1 further comprising the step of:
  utilizing a programmer loaded bit or bits to allow groups of registers to be selected dependent upon the programmer loaded bit or bits.

5. The process of claim 4 wherein the compact instruction operand register specification bit field contains bits defining an offset from a register base address and the operand register is determined by concatenating said offset with said programmer loaded bit or bits.

6. A process for dynamically creating a task specific compacted instruction comprising the steps of:

storing programmer selected 32-bit instructions at specific addresses of a partitioned indirect very long instruction word memory (VIM);

utilizing function bits in a compacted instruction to select which partition of the partitioned VIM is to be accessed in creating the compacted instruction;

utilizing VIM offset bits in a compacted instruction to generate the address of the selected VIM to read one of the previously stored 32-bit instructions; and combining bit fields from the compacted instruction and the previously stored 32-bit instruction to create the task specific instruction.

7. The process of claim 6 wherein said VIM offset bits in the compacted instruction are added to a base register address to generate a VIM address.

8. The process of claim 6 wherein said VIM offset bits in the compacted instruction are added to a function specific base register address to generate a VIM address.

9. The process of claim 6 wherein said bit fields from the compacted instruction are bit fields that change frequently.

10. An indirect very long instruction word (iVLIW) processor comprising:

a plurality of execution units capable of performing a plurality of distinct operations in parallel;

a VLIW memory (VIM) for storing VLIWs, said VIM being divided into separate VIM sections each of which is associated with one of said plurality of execution units, said VIM sections storing instructions in each of the memory entry slots;

an addressing mechanism using address information contained in compacted instruction format for each of said VIM sections providing access to each memory entry, in its associated VIM section independently for input to a translation mechanism; and a translation mechanism for dynamically translating compacted instructions into uncompacted instructions.

11. The processor of claim 10 wherein the compacted instructions are 15-bit instructions and the uncompacted instructions are 32-bit instructions.

12. A SIMD machine with an array comprising at least one processing element (PE) and an array control processor, the array control processor comprising:

a plurality of execution units capable of performing a plurality of distinct operations in parallel;

a VLIW memory (VIM) for storing VLIWs, said VIM being divided into separate VIM sections each of which is associated with one of said plurality of execution units, said VIM sections storing instructions in each of the memory entry slots;

an addressing mechanism using address information contained in compacted instruction format for each of said VIM sections providing access to each memory entry, in its associated VIM section independently for input to a translation mechanism; and a translation mechanism for dynamically translating compacted instructions into uncompacted instructions.

* * * * *